United States Patent
Den Besten et al.

(10) Patent No.: US 8,031,746 B2
(45) Date of Patent: Oct. 4, 2011

(54) SYNCHRONIZED RECEIVER

(75) Inventors: Gerrit Willem Den Besten, Eindhoven (NL); Tim Pontius, Crystal lake, IL (US)

(73) Assignee: ST-Ericsson SA, Geneva (CH)

( * ) Notice: Subject to any disclaimer, the term of this patent is extended or adjusted under 35 U.S.C. 154(b) by 389 days.

(21) Appl. No.: 12/094,305

(22) PCT Filed: Nov. 22, 2006

(86) PCT No.: PCT/IB2006/054379
§ 371 (c)(1),
(2), (4) Date: May 20, 2008

(87) PCT Pub. No.: WO2007/060620
PCT Pub. Date: May 31, 2007

(65) Prior Publication Data
US 2008/0279225 A1    Nov. 13, 2008

(30) Foreign Application Priority Data
Nov. 22, 2005   (EP) .................................... 05111110

(51) Int. Cl.
*H04J 3/06* (2006.01)
(52) U.S. Cl. ........................................ 370/508; 370/350
(58) Field of Classification Search .................. 370/350, 370/502–520
See application file for complete search history.

(56) References Cited

U.S. PATENT DOCUMENTS

| | | | | |
|---|---|---|---|---|
| 6,239,793 B1 * | 5/2001 | Barnert et al. | ................ | 715/201 |
| 6,988,216 B2 * | 1/2006 | Lauder | ........................... | 713/400 |
| 7,339,502 B2 * | 3/2008 | Furtner | .......................... | 341/55 |
| 2003/0091056 A1 * | 5/2003 | Walker et al. | ................ | 370/419 |
| 2003/0148801 A1 | 8/2003 | Deyring et al. | | |
| 2003/0158991 A1 * | 8/2003 | Deyring et al. | ............... | 710/305 |
| 2005/0141661 A1 * | 6/2005 | Renaud et al. | ................ | 375/372 |
| 2007/0164883 A1 * | 7/2007 | Furtner | ......................... | 341/126 |

FOREIGN PATENT DOCUMENTS

| | | |
|---|---|---|
| EP | 0841766 A1 | 5/1998 |
| WO | 0251081 A2 | 6/2002 |

OTHER PUBLICATIONS

Aloisio, A; et al "Serial and Parallel Optical Link Architectures for DAQ Systems" 2002 IEEE Nuclear Science Symposium Conference Record, vol. 3 of 3, Nov. 10, 2002, pp. 207-211.

* cited by examiner

Primary Examiner — Phuc Tran (57) ABSTRACT

There is provided a method of operating a communications system comprising a transmitting station and a receiving station, the method in the transmitting station comprising encoding a clock signal with data to form encoded signals for transmission; transmitting the encoded signals to the receiving station; the method in the receiving station comprising decoding the encoded signals to extract the clock signal and data; processing the data under the control of the decoded clock signal. The method further comprises, when no data is required to be transmitted to the receiving station, transmitting further encoded signals to the receiving station in order for the receiving station to decode the further encoded signals and extract a clock signal.

25 Claims, 4 Drawing Sheets

SYNCHRONIZED RECEIVER

FIELD OF THE INVENTION

The invention relates to a communications system, a transmitting station for use in the system, a receiving station for use in the system, and a method of operating the communications system.

BACKGROUND OF THE INVENTION

A conventional communications system is known from International application WO 02/51081. A problem of the conventional system is that no clock signal is available at the receiving station once all data is transmitted from the transmitting station to the receiving station.

OBJECT AND SUMMARY OF THE INVENTION

Amongst others, it is an object of the invention to provide a communication system that facilitates the generation of a clock signal at the receiving station after completion of the transmission of data, or at any other time when there is no requirement to send data or control messages to the receiving station.

In accordance with a first aspect of the invention, there is provided a method of operating a communications system comprising a transmitting station and a receiving station, the method in the transmitting station comprising encoding a clock signal with data to form encoded signals for transmission; transmitting the encoded signals to the receiving station; the method in the receiving station comprising decoding the encoded signals to extract the clock signal and data; processing the data under the control of the decoded clock signal; characterized in that the method further comprises when no data is required to be transmitted to the receiving station, transmitting further encoded signals to the receiving station in order for the receiving station to decode the further encoded signals and extract a clock signal.

In accordance with a second aspect of the invention, there is provided a transmitting station for use in transmitting data to a receiving station, the transmitting station comprising transmitter circuitry for encoding a clock signal with data to form encoded signals to be transmitted and transmitting the encoded signals to the receiving station; wherein, when no data is required to be transmitted to the receiving station, the transmitting station is adapted to transmit further encoded signals to the receiving station in order for the receiving station to decode the further encoded signals and extract a clock signal.

In accordance with a third aspect of the invention, there is provided a receiving station for use in for receiving data from a transmitting station, the receiving station comprising receiver circuitry for receiving encoded signals from the transmitting station, the encoded signals comprising data encoded with a clock signal; the receiver circuitry being further adapted to decode the encoded signals to extract the clock signal and data; a data processing circuit for processing the data under the control of the decoded clock signal; wherein, when no data is required to be transmitted to the receiving station, the receiving station is adapted to receive further encoded signals from the transmitting station in order for the receiving station to decode the further encoded signals and extract a clock signal.

In accordance with a fourth aspect of the invention, there is provided a communications system comprising a transmitting station and a receiving station as described above.

BRIEF DESCRIPTION OF THE DRAWINGS

The invention will now be described, by way of example only, with reference to the accompanying drawings, in which.

DESCRIPTION OF EMBODIMENTS

In the following, the invention will be described for the most part with reference to a communications system operating according to the Mobile Industry Processor Interface (MIPI) Alliance D-PHY physical layer specification. However, it will be appreciated by a person skilled in the art that the invention is applicable to communications systems operating according to protocols defined in other specifications.

Figure 1:
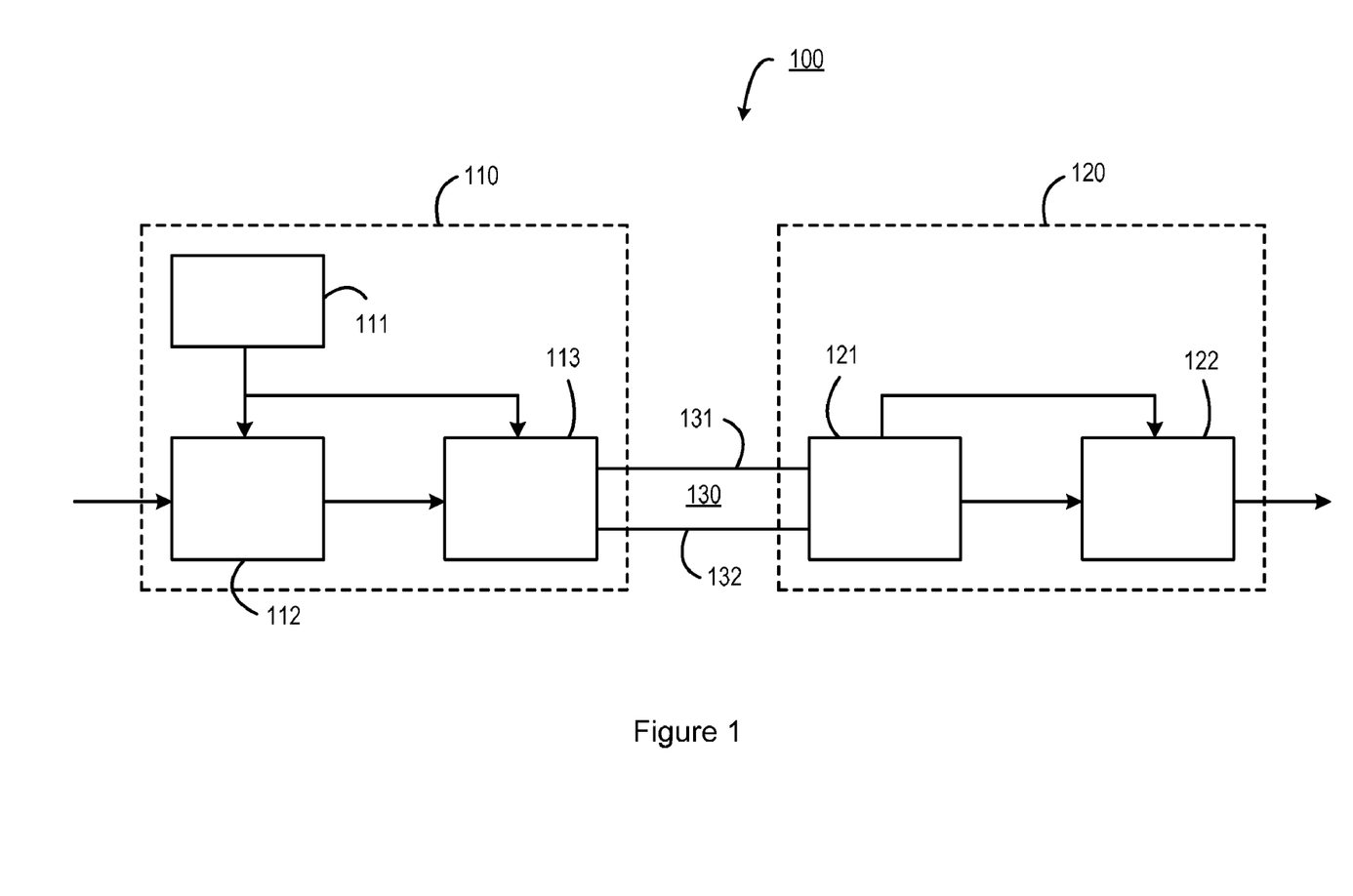
FIG. 1 shows an embodiment of a communication system according to the invention.

FIG. 1 shows an embodiment of a communications system 100 according to the invention. The communication system comprises a first station 110, a second station 120, and a communications bus 130 coupling the first station 110 to the second station 120. In this embodiment, the first station 110 is a transmitting station, and comprises a clock circuit 111, a data generating circuit 112 and a transmitter circuit 113. The clock circuit 111 generates and supplies a clock signal to the data generating circuit 112 and the transmitter circuit 113. The data generating circuit 112 supplies payload data to the transmitter circuit 113. The transmitter circuit 113 is coupled to two signal lines 131, 132 of the communication bus 130. The second station 120, which is a receiving station in this embodiment, comprises a receiver circuit 121 coupled to the two signal lines 130, 131, and a data processing circuit 122.

Although the communications bus 130 is shown as having two signal lines 131, 132, it will be appreciated by a person skilled in the art that communications buses having more than two signal lines may be used in accordance with the invention.

Typically, the transmitting station 110 and the receiving station 120 are separate integrated circuits connected by the signal lines that form the bus 130. However the first station 110 and the second station 120 could also be implemented as different sub-circuit arrangements of a single integrated circuit, with the bus 130 comprising conductive tracks on the integrated circuit.

In addition (although not illustrated), the first station 110 may be arranged for receiving data from the second station 120 and the second station 120 may be arranged for transmitting data to the first station 110 to facilitate bi-directional communication between the first and second stations. To this end, the first station 110 may comprise a respective receiver circuit and a respective data processing circuit, while the second station 120 may comprise a respective clock circuit, a respective data generating circuit and a respective transmitter circuit.

In operation, the data generating circuit 112 in the first station 110 can generate payload data words or process payload data words received from another source. These payload data words may comprise, for example, audio or video image data or the results of computations. The first station 110 transmits the data words via the communications bus 130 to the second station 120. The second station 120 receives the data words and processes them, for example to display or store video information, to generate audio signals or to perform computations on the data words.

In addition to generating or processing data words, the data generating circuit 112 in the first station 110 can generate control or command data that are transmitted to the second station 120 via the communications bus 130, and which can allow the first station 110 to control the operation of the second station 120, once the control or command data has been processed by the data processing circuit 122.

Under the MIPI protocol, when a command is to be transmitted to the second station 120, the command is preceded by a particular signal known as a request for escape mode. This request indicates to the second station 120 that the following transmission from the first station 110 will be command data. The request for escape mode will be described later.

In both situations (i.e. when payload data or command data is transmitted), the transmitter circuit 113 receives the clock signal from the clock circuit 111 and information from the data generating circuit 112, and encodes the information and the clock signal into first and second signals for transmission via the first signal line 131 and the second signal line 132 of the communications bus 130 respectively.

In an alternative embodiment, the transmitter circuit 113 can generate the control data or command data and insert them in the appropriate places in the information to be transmitted to the second station 120. Again, the transmitter circuit 113 receives the clock signal from the clock circuit 111 and payload data words from the data generating circuit 112, and encodes the payload data or commands with the clock signal to form first and second signals for transmission via the first signal line 131 and the second signal line 132 of the communications bus 130 respectively.

The receiver circuit 121 receives the two signals from the first and second signal lines 131, 132 and decodes the information and the clock signal. The decoded clock signal is then used to clock the data processing circuit 122, which also receives the decoded information (which may be payload data or command data), and processes the decoded information.

The communications system 100 is arranged for serialized data communication, which means that bits or data signals are provided consecutively across the communications bus 130. Thus payload data words or command data consisting of groups of bits are transmitted via communications bus 130 one bit after another. Individual payload data words may be grouped into data packets.

Thus, as described above, the transmission of data is self-clocking. This means that transmitted signals are encoded in a way that the data (from a payload data word or command word) and clock for each bit can be derived in the receiving station 120 after decoding. This derivation is possible without receiving an explicit and separate clock signal. This means that it is not necessary to generate or regenerate a clock signal in the second station 120 by, for instance, an oscillator or a phase-locked loop (PLL). Thus, the communications system 100 can operate asynchronously.

Figure 2:
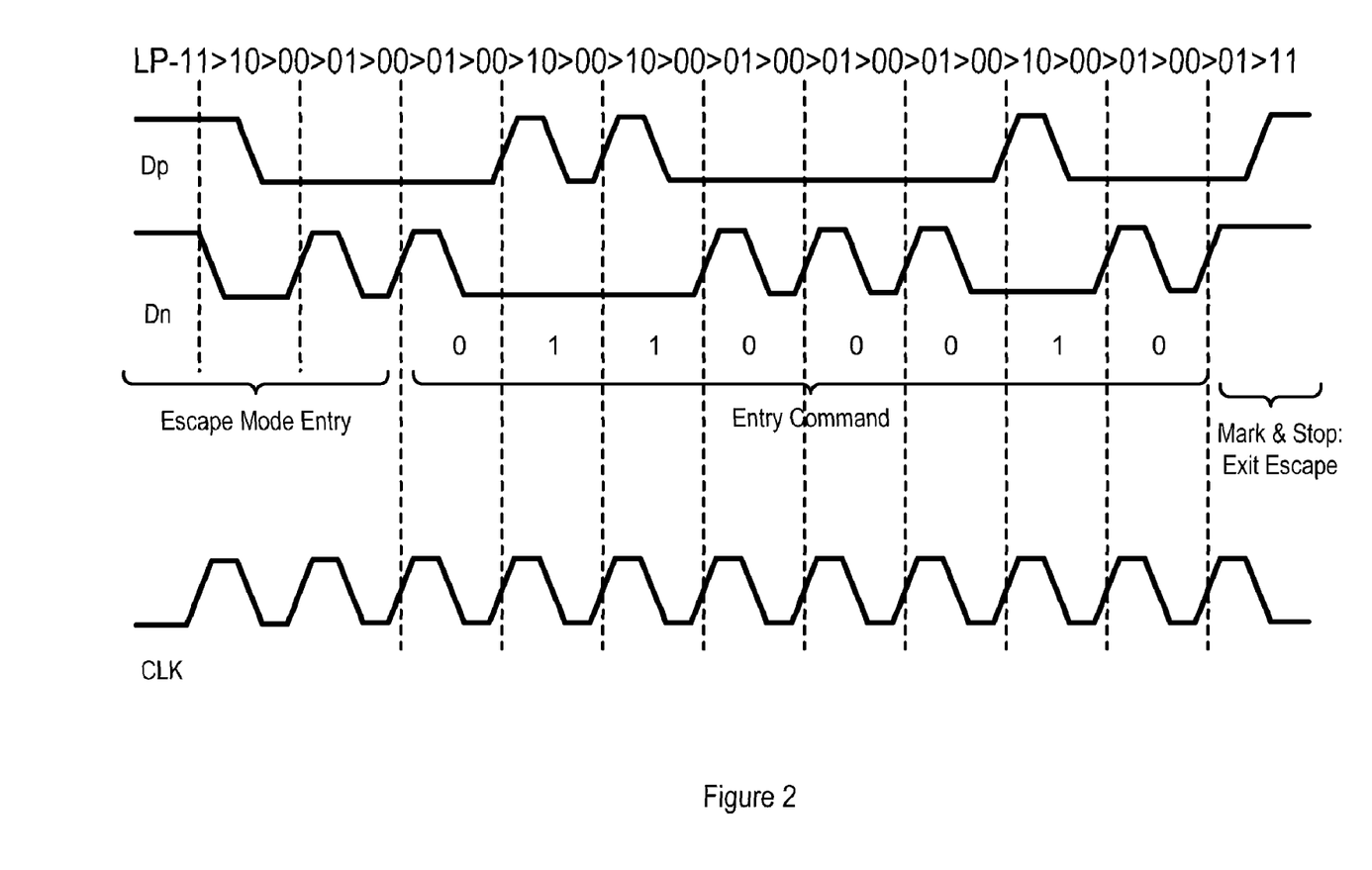
FIG. 2 shows an example of an escape mode transmission between the first station and the second station of the communications system according to the MIPI protocol.

FIG. 2 shows an example of transmissions between the first station 110 and the second station 120 of the communications system 100 in accordance with the One-Spaced-Hot encoding scheme used in the MIPI protocol. In this example, the first encoded data signal transmitted over data line 131 is referred to as Dp and the second encoded data signal transmitted over data line 132 is referred to as Dn. The third signal shown in FIG. 2, CLK, refers to the clock signal recovered in the second station 120 from the two signals Dp and Dn. The clock signal CLK is generated by performing an exclusive-or (EXOR) operation on the first and second encoded signals.

The clock signal in this example has two phases. As can be seen, each of the data lines carries a bit pair during each clock cycle. The data bits (i.e. either a '0' bit denoted Mark-0 or a '1' bit, denoted Mark-1) are derived from the signals on both signal lines during the first phase of each clock cycle. Thus, to transmit a '0' bit, the signal on line Dp in the first phase of the clock period is low, and the corresponding signal on line Dn is high. To transmit a '1' bit, the signal on line Dp in the first phase of the clock period is high, and the corresponding signal on line Dn is low. This can be seen in FIG. 2.

It will be appreciated that in order to generate the clock signal from the lines Dp and Dn, there must be two transitions on the lines Dp and Dn in each clock cycle.

Furthermore, as there is a STOP state defined in the MIPI protocol, which occurs when the signals on both signal lines Dp and Dn are high (11), and which indicates to the receiving station 120 that a transmission has ended or that there is no payload data or command data to be transmitted at that point, it is necessary to include a SPACE (SPC) between each data bit transmitted to the receiving station 120. This SPACE occurs when the signals on both signal lines are low (00), and can be seen in the second phase of each clock period in FIG. 2. Thus, as there are two transitions on the lines Dp and Dn in each period, a corresponding clock signal is generated.

In the signaling diagram of FIG. 2, a request for an escape mode is shown, followed by entry command data, comprising bits 01100010. After the entry command, there is a Mark (in this case a Mark-0) followed by a STOP.

Although the invention will be described further with reference to the One-Spaced-Hot encoding in the MIPI protocol, it will be appreciated that the invention can be applied to systems using other clock encoding schemes, such as Data-Strobe signaling and High-Low-Line transition signaling.

It will also be appreciated that in other implementations (although not in the MIPI protocol), a clock signal having more than two phases is also possible. In this case, the signals on each line are selected so that for each bit there is one and only one transition on the signal lines.

As disclosed in WO 02/51081, communications systems that operate asynchronously are known as such. These known communications systems have the disadvantage that after transmission of the last data bit, transmission is terminated and therefore no clock information can be derived from the communication lines by the receiving station 120. As a result, the second station 120 will not be able to further process previously received and decoded data words or initiate actions in response to command words or other previously received and decoded payload data words.

In the conventional system, facilitating generation of additional clock cycles in the absence of a clock circuit in the second station can require the transmission of additional bits over the communications bus. These data bits can be encoded in such a way that it is possible to distinguish between real data and data to be ignored. However, such a coding scheme is in many cases not practical, since it results in additional overhead in the transmission of every valid data word of transmitted data.

Another way to avoid the problem is to reserve certain data bytes or words for use as data to be ignored or for commands. However, this leads to problems for applications that need to send arbitrary data values. Reduction of the available data set can be avoided, for example, by a rule that specifies if a reserved word is to represent data then it is sent twice. Thus, this additional copy of the reserved word indicates that the preceding data byte or word is to be processed by the receiving station as proper data, and is not data to be ignored or a command/control word. However, in the extreme case, this may lead to an additional overhead of a factor of two. Furthermore, it causes a non-constant bit-rate encoding.

Yet another way to avoid the problem is to include a local clock generation circuit at the second station. For some applications this may result in disadvantages due to the additional silicon die area required, the additional I/O pins required in case of a non-integrated clock circuit, possible additional components, and the increased power consumption required to operate the clock generation circuit. These disadvantages may have a large impact, particularly if such a local clock generation circuit is not needed for other purposes.

In addition, each of these solutions has the further disadvantage that there is a significant increase in design complexity in order to achieve an otherwise relatively simple and basic object—the provision of a clock signal in the receiving station after data transmission has been completed, or at a point where there is no payload data or command data to be transmitted.

Figure 3:
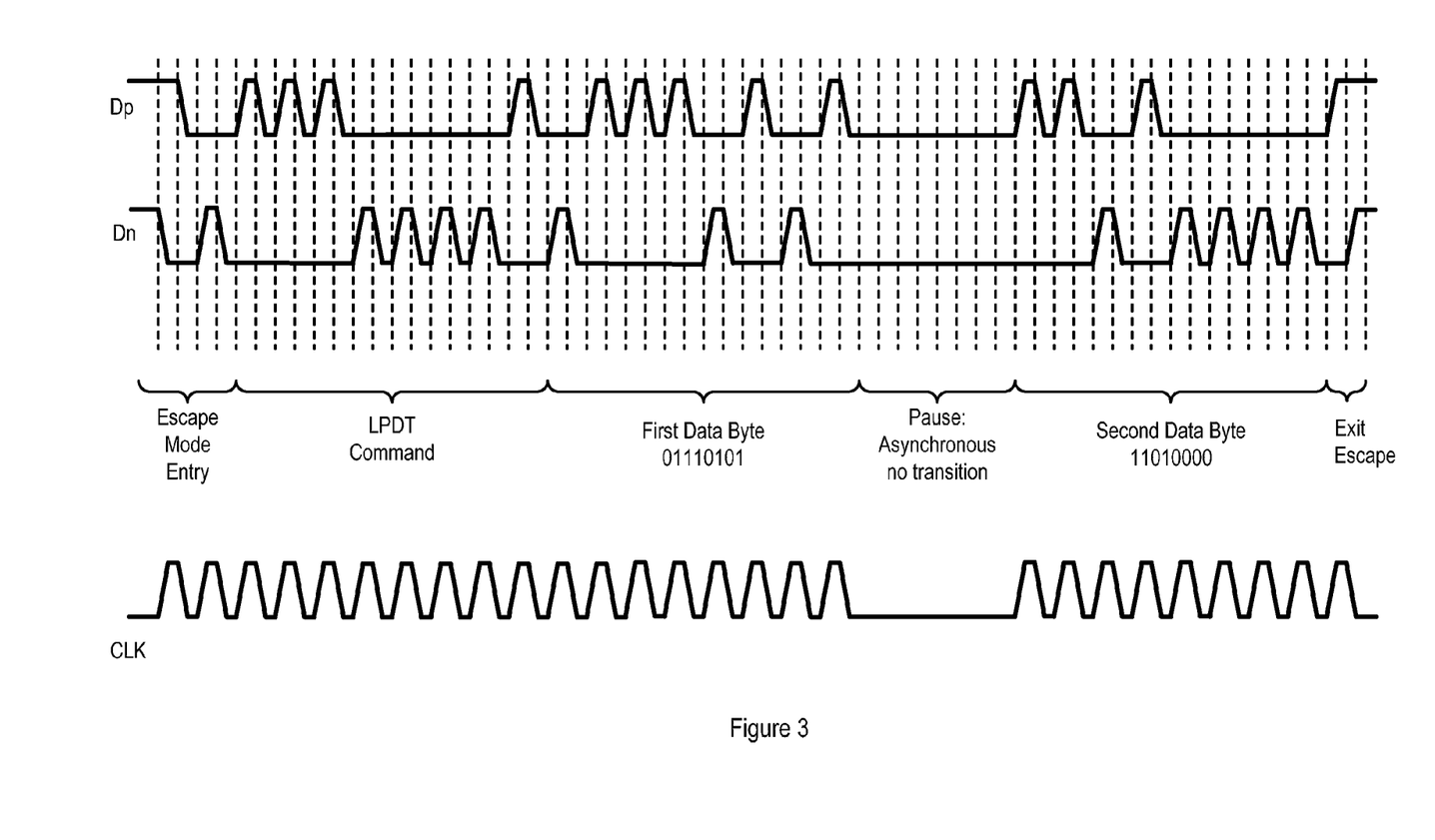
FIG. 3 shows an example of a data transmission between the first station and second station of the communications system according to the MIPI protocol.

FIG. 3 illustrates this problem in a system that uses the One-Spaced-Hot encoding of the MIPI protocol. As shown, a request for escape mode is sent to the receiving station 120, followed by a command. As the first station 110 wishes to transmit payload data words to the second station 120, the command data is a low-power data transmission (LPDT) command, which indicates to the second station 120 that the bits following the command are data bits to be processed. Then, a first payload data byte is transmitted.

After transmission of the first payload data byte, there is a pause as there is no further payload data to be transmitted, which means that the signals on lines Dp and Dn are held low. Thus, it can be seen that no clock signal will be generated in the receiving station 120 during this pause.

When a second payload data byte is transmitted, it is again possible for the receiving station to generate a clock signal from the signal lines Dp and Dn.

Therefore, in the communications system according to the invention, when there is no data (i.e. either payload data or command data) required to be transmitted to the receiving station 120, and therefore no clock signal in the receiving station, data is nevertheless transmitted to the receiving station 120 in order for the receiving station 120 to generate a clock signal. In a preferred embodiment, a command without data or other control function is used to maintain a clock signal for a number of cycles after completion of the data transmission (or at a point where there is no data or command to be transmitted) from the first (transmitting) station 110 to the second (receiving) station 120. This dedicated command is designated a NOP (No OPeration) command herein. The NOP command can follow the transmission of payload data or other command data. On reception and decoding of the clock signal encoded with the NOP command by the second station 120, the data processing circuit 122 will then ignore the NOP command. Alternatively, on reception and decoding of the clock signal encoded in the NOP command, the receiver circuit 121 does not pass any information to the data processing circuit 122, other than the decoded clock signal.

Regardless of the way in which the NOP command is handled by either the receiver circuit 121 or the data processing circuit 122, the effect is that further clock cycles can be generated by the receiving station 120, which thereby allows the receiving station 120 to continue the processing of payload data received earlier by the data processing circuit 122 or to allow the data processing circuit 122 to initiate actions or generate output signals in response to the payload data. In other words, when the bits on the data lines 131, 132 representing the NOP command are combined using an EXOR operation, a clock signal as shown in FIGS. 2 and 3 is recovered.

As described above, in the MIPI protocol, a STOP state is defined, which indicates to the receiving station 120 that a transmission has ended, or that there is no payload data or command data to be transmitted at that point. As shown in FIGS. 2 and 3, the STOP state is indicated where both signals, Dp and Dn are high (11). This is a quiescent state. This state is avoided during actual data communication between the first and second stations 110, 120, which means that the other remaining states are used for communication. Also as described above, to communicate a series of bits from the first station 110 to the second station 120, the first station 110 sends MK0s for a zero-bit (which occurs when the signal lines Dp and Dn are simultaneously in the states 0 and 1 respectively), or MK1s for a one-bit (which occurs when the signal lines Dp and Dn are simultaneously in the states 1 and 0 respectively) as required, interspersed by spaces (SPC) which occur when both of the signal lines are in the 0 state. Thus, the transmission of a single word comprises (data bit)-(space)-(data bit)-(space)-(data bit)-(space)-(data bit)-(space)-(data bit)-(space)-(data bit)-(space)-(data bit)-(space)-(data bit)-(space). The SPC ensures that the STOP state will not be present on the signal lines, even during transition periods. As discussed above, the signals Dp and Dn are generated in such a way that if logically combined using an EXOR gate, the output of the EXOR gate will toggle twice (once low-to-high and once high-to-low) for each bit and space transmitted. This provides a two-phase clock signal as shown in FIGS. 2 and 3.

Figure 4:
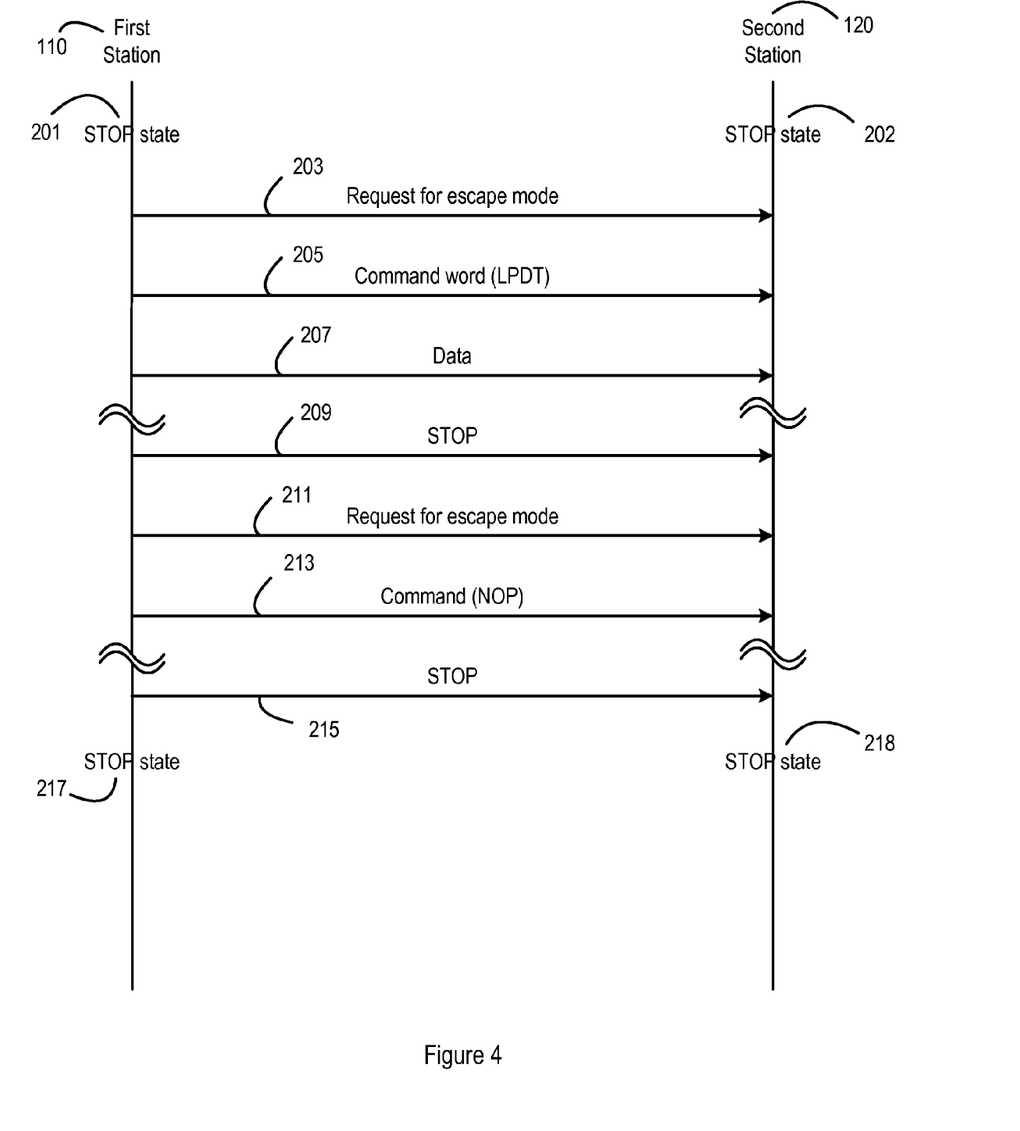
FIG. 4 is a signaling diagram illustrating the operation of the system in accordance with the invention.

FIG. 4 is a signaling diagram illustrating the operation of this protocol in accordance with the invention. In FIG. 4, the first station 110 is initially in a STOP state (201) and second station 120 is also in a STOP state (202).

When the first station 110 wishes to commence transmission of payload data to the second station 120, a Request for an escape mode (203) is sent to the second station 120. This request is a particular sequence of bits, which is followed by an entry command code that indicates to the second station 120 the requested action. In the MIPI protocol, these entry commands are eight-bit words that are selected so as to obtain maximum robustness and reliability against error mechanisms.

If the first station wishes to transmit payload data words to the second station, the command word is a low-power data transmission (LPDT) command (205), which indicates to the second station 120 that the bits following the command are payload data bits to be processed. Payload data words are then transmitted to the second station 120 (signal line 207). Once the data transmission is complete, the STOP state (209) is transmitted to the second station 120. As discussed above with reference to FIGS. 2 and 3, the STOP state occurs when the signals on the first and second signal lines 131, 132 are high simultaneously in a particular phase of a clock cycle.

It should be noted that, under the MIPI protocol, there is an additional MK between the space of the last bit of the data word and the STOP state. This avoids simultaneous transitions (signal edges) on both the signal lines.

In accordance with the invention, the receiving station 120 may require additional clock cycles in order to complete the tasks associated with the previously received payload data words. Therefore, a Request for escape mode (211) is sent from the first station 110 to the second station 120. The first station 110 then transmits at least one NOP command (213) to the second station 120. If a plurality of NOP commands are transmitted to the second station 120, the NOP commands are concatenated, which means that a Request for Escape Mode is not required prior to each NOP command. As described above, the second station 120 receives the NOP command and decodes the clock signal from the bits used to transmit the command.

The number of NOP commands transmitted to the second station 120 depends on the number of additional clock cycles required by the second station 120 in order to complete the processing of the previously received payload data words.

When the required number of NOP commands have been sent to the second station 120, a STOP signal (215) is transmitted to the second station 120. Then both the first station 110 and second station 120 enter respective STOP states 217, 218.

In the MIPI protocol, command words are 1 byte long (i.e. 8 bits), which means that each NOP command will provide the receiving station 120 with eight additional clock cycles. Therefore, taking into account the overhead involved in starting and stopping data transmissions (i.e. the Request for Escape Mode, etc) the number of additional clock cycles will be equal to 8*N+3, where N is the number of NOP commands sent to the second station 120.

In protocols other than the MIPI protocol, the length of the command words and the overhead required to start and stop data transmissions may be different, which means that the number of additional clock cycles will be given by A*N+B, where A is the number of bits in the command words and B is the overhead required to start and stop a transmission.

As described above, in the first station 110 the data generating circuit 112 may be arranged to generate only the actual payload data words to be transmitted, while the transmitter circuit 113 is arranged to add the required NOP command or commands. Alternatively the data generating circuit 112 can also generate the NOP commands succeeding the payload data words.

In an alternative embodiment of the invention, a command other than the NOP command can be repeated and transmitted to the receiving station 120 by the transmitting station 110 in order for the receiving station 120 to be able to be able to generate a clock signal. For example, in the MIPI protocol, a RESET command is defined. Under the MIPI protocol, after receiving a RESET command, the receiving station 120 will not be expecting any further data, or repetition of the RESET command. Therefore, in accordance with the invention, commands can be repeated when they would otherwise not be expected to be repeated, or commands that do not indicate to the receiving station 120 that payload data is to be transmitted (i.e. commands other than the LPDT command) can be followed by discardable payload data. In either case, the receiving station 120 uses the additional signals over the bus 130 to generate a clock signal.

The communications system according to the invention may have alternative modes of operation. In such an embodiment the communications system may utilize a mechanism to start and stop transmission in order to enable burst-wise transmission of data in data packets. This may be done both with in-band signals (representing exception states or codes) or separate signals. Such asynchronous transmission may be indicated by an entry code at the beginning of the burst. In that case, one or more of the entry codes may be defined or considered as a NOP (No Operation) code, which means that the data processing circuit 122 may ignore it. Thus it will only result in transmission of this packet from the first station 110 to the second station 120 and in the generation of a clock signal at the second station 120 to allow the data processing circuit 122 to process earlier received payload data or to initiate actions based on earlier received payload data.

In a communications system where this mode of communication is one out of a number of possible modes of communication, the mode as illustrated in the example of FIG. 4 may be entered by sending a certain sequence of bits in one of the other modes to enter the correct starting condition to transport the bits over the communications bus 130. In the mode of communication in the example of FIG. 4, bits may be grouped into bytes of eight successive bits that indicate commands, instructions, or payload data to be processed by the second station 120. Command, instruction, or payload data words of other lengths are also possible. To enable error detection or error correction, the number of commands or valid payload data words may be limited to a subset of the potentially possible number of words. For instance, if only bytes of commands or instructions are transmitted, the instruction set could be limited to 8 out of the 256 possible codes, whereby the 8 codes used are chosen in such a way that the bit distance between them is as large as possible to increase the possibilities for error detection or correction.

While the invention has been illustrated and described in detail in the drawings and foregoing description, such illustration and description are to be considered illustrative or exemplary and not restrictive; the invention is not limited to the disclosed embodiments.

For instance in the embodiment shown in FIG. 1, only two data lines are present in the communications bus 130, 131. Alternatively, the communications system may comprise additional data lines for transmitting data. Furthermore, the communications system may also facilitate other modes of communication in which data is sent over the communications bus utilizing a different protocol and at other, for instance higher, data rates. Also the system may incorporate additional clock lines between the first and second stations. These other modes may also utilize additional data lines between the first and second station. Furthermore, the second station may comprise a clock generation or regeneration circuit to facilitate communication in these other modes. In such embodiments, the self-clocking mode may be a low-power data communications mode in which only the data lines 131, 132 are used, and all other data lines or clock lines are not used, while the clock generation or regeneration circuit in the receiving station 120 is disabled.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of operating a communications system comprising:
    a transmitting station and a receiving station, the method comprising:

encoding, by the transmitting station, a clock signal with data to form encoded signals for transmission wherein the data comprises payload data and/or command data;

transmitting the encoded signals to the receiving station;

decoding, by the receiving station, the encoded signals to extract the clock signal and data;

processing the data under the control of the decoded clock signal;

wherein when no data is required to be transmitted to the receiving station, transmitting further encoded signals comprises a clock signal encoded with command data to the receiving station in order for the receiving station to decode the further encoded signals and extract a clock signal;

wherein the command data comprises at least one command word without data or other control function; and wherein after decoding the further encoded signals to extract the clock signal, the receiving station discards the at least one command word.

2. A method as claimed in claim 1, wherein the command data comprises a plurality of concatenated command words.

3. A method as claimed in claim 1, wherein the further encoded signals comprise command data followed by payload data.

4. A method as claimed in claim 1, wherein the encoded signals for transmission comprise separate signals that are transmitted across at least two signal lines between the transmitting station and the receiving station.

5. A method as claimed in claim 4, wherein the step of decoding comprises performing exclusive-OR operations on the separate signals transmitted across the at least two signal lines.

6. A method as claimed in claim 1, wherein, prior to transmission of payload data words to the receiving station, the transmitting station encodes a command with the clock signal to form encoded signals for transmission and transmits the signals to the receiving station, the command indicating to the receiving station that subsequently transmitted data will comprise at least one payload data word.

7. A transmitting station for use in transmitting data to a receiving station, the transmitting station comprising:

transmitter circuitry configured to:
encode a clock signal with data to form encoded signals to be transmitted, wherein the data comprises payload data and/or command data;
transmit the encoded signals to the receiving station, wherein, when no data is required to be transmitted to the receiving station, the transmitting station is adapted to transmit further encoded signals to the receiving station in order for the receiving station to decode the further encoded signals and extract a clock signal, and wherein the further encoded signals comprise a clock signal encoded with command data; and
wherein the commands are selected from a predetermined set of command words.

8. A transmitting station as claimed in claim 7, wherein the transmitting station further comprises a data generation circuit configured to provide payload data to the transmitter circuitry.

9. A transmitting station as claimed in claim 8, wherein the transmitter circuitry is adapted to generate the command data.

10. A transmitting station as claimed in claim 7, wherein the data generation circuit is further adapted to provide the command data to the transmitter circuitry.

11. A transmitting station as claimed in claim 7, wherein the command data comprises a plurality of concatenated command words.

12. A transmitting station as claimed in claim 7, wherein the command data comprises at least one command word without data or other control function.

13. A transmitting station as claimed in claim 12, wherein after decoding the further encoded signals to extract the clock signal, the receiving station discards the at least one command word.

14. A transmitting station as claimed in claim 7, wherein the further encoded signals comprise command data followed by payload data.

15. A transmitting station as claimed in claim 7, further comprising a clock circuit configured to generate the clock signal and providing the clock signal to the transmitter circuitry.

16. A transmitting station as claimed in claim 7, wherein the transmitting station is implemented in an integrated circuit.

17. A receiving station for receiving data from a transmitting station, the receiving station comprising:

receiver circuitry configured to receive encoded signals from the transmitting station, the encoded signals comprising data encoded with a clock signal wherein the data further comprises payload data and/or command data, the receiver circuitry being further adapted to decode the encoded signals to extract the clock signal and data;

a data processing circuit configured to process the data under the control of the decoded clock signal, wherein, when no data is required to be transmitted to the receiving station, the receiving station is adapted to receive further encoded signals comprising a clock signal encoded with command data from the transmitting station in order for the receiving station to decode the further encoded signals and extract a clock signal;

wherein the command data comprises at least one command word without data or other control function; and wherein after decoding the further encoded signals to extract the clock signal, the receiving station discards the at least one command word.

18. A receiver as claimed in claim 17, wherein the command data comprises a plurality of concatenated command words.

19. A receiver as claimed in claim 17, wherein the further encoded signals comprise command data followed by payload data.

20. A receiving station as claimed in claim 17, wherein the receiving station is implemented in an integrated circuit.

21. A receiving station as claimed in claim 17, wherein the receiving station is for use in a communications system that is adapted to use the MIPI protocol.

22. A communications system comprising a transmitting station and a receiving station, the transmitting station comprising:

transmitter circuitry configured to:
encode a clock signal with data to form encoded signals to be transmitted, wherein the data comprises payload data and/or command data;
transmit the encoded signals to the receiving station, wherein, when no data is required to be transmitted to the receiving station, the transmitting station is adapted to transmit further encoded signals to the receiving station in order for the receiving station to decode the further encoded signals and extract a clock signal, and wherein the further encoded signals comprise a clock signal encoded with command data;

wherein the command data comprises at least one command word without data or other control function; and wherein after decoding the further encoded signals to extract the clock signal, the receiving station discards the at least one command word.

23. A communications system according to claim 22, further comprising a communications bus configured to couple the transmitting station and the receiving station, the communications system configured for encoding by the first station a first data signal and a second data signal, the first and second encoded data signals encoded by the first station out of a data signal comprising data-words out of predetermined set of data-words and a clock signal, wherein the first and second encoded data signals are transmitted over the communications such that the receiving station receives the first encoded data signal and the second encoded data signal;

decodes the first and second encoded data signals into decoded data signal comprising the coded instructions and a decoded clock signal; and processes the decoded data signal under control of the decoded clock signal.

24. A method of operating a communications system comprising:

a transmitting station and a receiving station, the method comprising:

encoding, by the transmitting station, a clock signal with data to form encoded signals for transmission wherein the data comprises payload data and/or command data;

transmitting the encoded signals to the receiving station;

decoding, by the receiving station, the encoded signals to extract the clock signal and data; and processing the data under the control of the decoded clock signal;

wherein when no data is required to be transmitted to the receiving station, transmitting further encoded signals comprises a clock signal encoded with command data to the receiving station in order for the receiving station to decode the further encoded signals and extract a clock signal;

wherein the encoded signals for transmission comprise separate signals that are transmitted across at least two signal lines between the transmitting station and the receiving station; and wherein the step of decoding comprises performing exclusive-OR operations on the separate signals transmitted across the at least two signal lines.

25. A transmitting station for use in transmitting data to a receiving station, the transmitting station comprising:

transmitter circuitry configured to:

encode a clock signal with data to form encoded signals to be transmitted, wherein the data comprises payload data and/or command data;

transmit the encoded signals to the receiving station, wherein, when no data is required to be transmitted to the receiving station, the transmitting station is adapted to transmit further encoded signals to the receiving station in order for the receiving station to decode the further encoded signals and extract a clock signal, and wherein the further encoded signals comprise a clock signal encoded with command data;

wherein the command data comprises at least one command word without data or other control function; and wherein after decoding the further encoded signals to extract the clock signal, the receiving station discards the at least one command word.

* * * * *

UNITED STATES PATENT AND TRADEMARK OFFICE
CERTIFICATE OF CORRECTION

| | | |
|---|---|---|
| PATENT NO. | : 8,031,746 B2 | Page 1 of 1 |
| APPLICATION NO. | : 12/094305 | |
| DATED | : October 4, 2011 | |
| INVENTOR(S) | : Den Besten et al. | |

It is certified that error appears in the above-identified patent and that said Letters Patent is hereby corrected as shown below:

In The Specification

In Column 2, Line 39, delete "lines 130, 131," and insert -- lines 131, 132, --, therefor.

In Column 8, Line 27, delete "bus 130, 131." and insert -- bus 130. --, therefor.

Signed and Sealed this
Thirty-first Day of May, 2016

Michelle K. Lee
*Director of the United States Patent and Trademark Office*